Sept. 17, 1935.  C. R. BIRDSEY ET AL  2,014,795

PIPE FITTING

Filed Dec. 20, 1934

Inventors:
Edward Hall Taylor
Charles R. Birdsey
By: Brown, Jackson, Boettcher & Dienner,
Attys.

Patented Sept. 17, 1935

2,014,795

UNITED STATES PATENT OFFICE 2,014,795

PIPE FITTING

Charles R. Birdsey, Pasadena, Calif., and Edward Hall Taylor, Oak Park, Ill., assignors to Taylor Forge & Pipe Works, Cicero, Ill., a corporation of Illinois Application December 20, 1934, Serial No. 758,388

1 Claim. (Cl. 285—111)

This invention relates to the provision of improved ends on pipe fittings, which are to be abutted and welded together with a pipe length to make a continuous integral piece of the two parts so joined.

It is common practice in making such pipe joints to prepare the end of one or both parts to be joined so that when placed in abutting position for welding a continuous joint around the pipe is provided with an open V formation. Into this V the molten metal is deposited by suitable means and fills the V opening, fusing or welding to both ends, joining them into a continuous piece.

This common practice, now well known to the art, has several objections. When the molten metal flows into the opening it burns through the thin edges forming projections into the interior of the pipe, resulting in what are known to the trade as "icicles". These are objectionable on many counts, such as flow obstruction, sediment catchers, and harbors for corrosion and pollution beds.

Another objection to plain end joints butt to butt is the difficulty of keeping the two abutting pieces of pipe in correct alignment or even, at times, to hold them in the position desired. If they are not properly placed and held in place, the pipe is welded out of line, which is obviously objectionable.

In the art it has become a practice to place a separate piece of steel, of ring form, inside the pipe, and attempt to locate it directly under the joint, extending both ways beyond the joint into the end of each piece to be joined. This brings the ends into alignment and keeps them there, and also acts as a chill to harden the molten metal and dam it so it will not flow through into the inside. The ring is known as a chill ring and is well known in the art. It is objectionable, however, as it is difficult to place, is liable in time to get loose in the pipe and seldom fits closely to the pipe itself.

The object of this invention is to retain all the advantages of the chill rings while overcoming the objections thereto above mentioned, also many other advantages as later explained and still others obvious to those skilled in the art.

It is understood that in this description, when reference is made to pipe end, it means, ends in continuous runs of pipe, ends on pipe bends and ends on all kinds of elbows, valves, fittings and fixtures which are to be welded to each other to form the pipe run.

More specifically, the object of this invention is to provide improved pipe ends which have means for accurately aligning and holding in alignment while welding the parts to be joined by welding, quickly and easily; also, to provide a projection on one end which will extend into the other end, inside the pipe joint to form an annular chilling surface under the otherwise open joint, thus eliminating the possibility of the molten metal flowing into the pipe during the welding process. Another object of this invention is to provide a joint, one member of which is conventional and so simple that it can be formed with tools easily available in the field. The other member having the projection on it and requiring more extensive machinery can be formed and shipped from the shop already machined. Thus in practice all fittings, valves, etc., could be provided with the tongue projection on all openings and the pipe to which they are to be welded could be cut to suitable length and the ends prepared to receive to tongue with ordinary field pipe cutting tools.

Further objects and advantages will appear from the detailed description.

In the drawing:—

Figure 1:
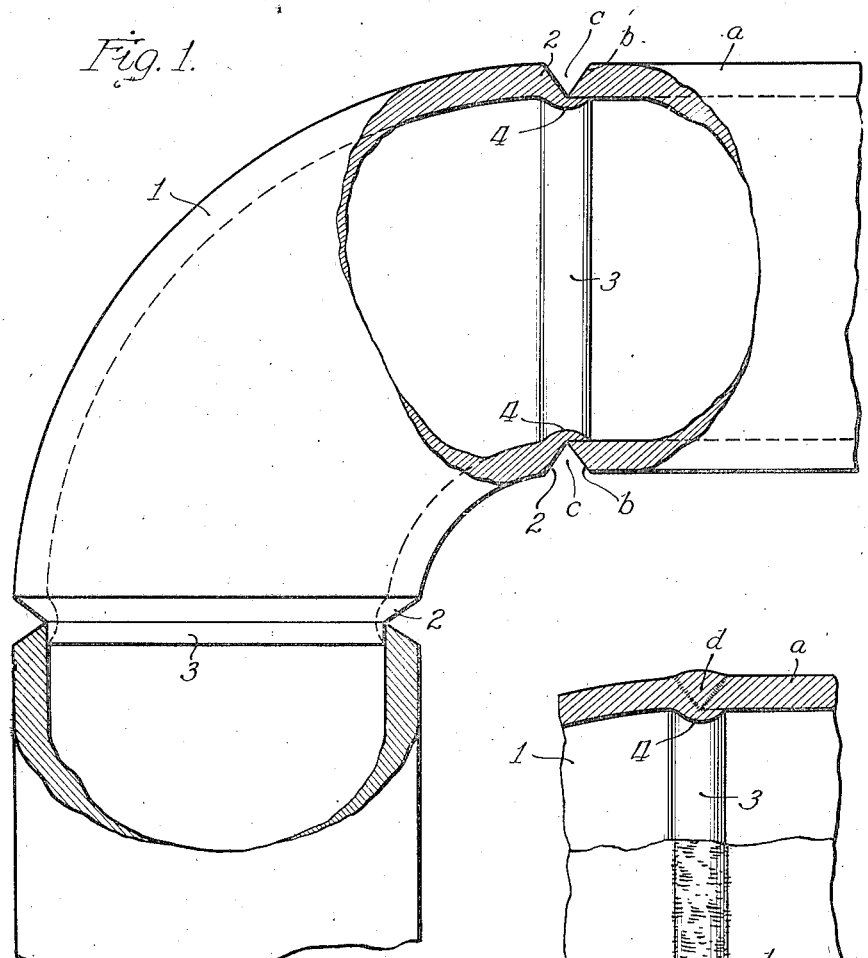
Figure 1 is an elevation of a fitting embodying our invention applied to the ends of two adjacent pipes disposed at right angles to each other, the pipes and fitting being partly broken away and in section.
Figure 2:
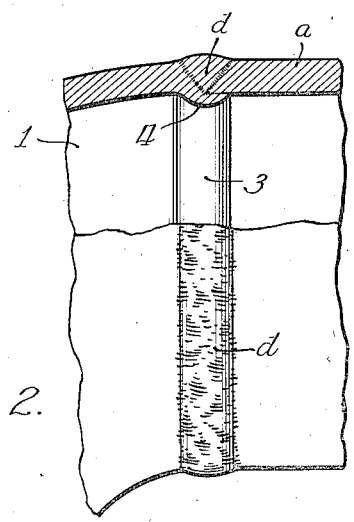
Figure 2 is a fragmentary view partly broken away, and in section, of a fitting comprising our invention welded to a pipe end.

We have illustrated our invention by way of example, in Figures 1 and 2, as applied to a 90° elbow, but it will be understood that our invention may be applied to all fittings, fixtures and continuous pipes and pipe bends which are to be welded into a continuous run.

The members to be joined comprise on one side a member 1, beveled at the end 2, so that when brought into abutting relation with the other member $a$ to which it is to be welded, and which also is provided with a beveled end $b$, there is formed a welding trough $c$.

The member 1 is provided with an integral lip 3, projecting outward from the end thereof, beyond the bottom of the beveled end. This projecting lip is so formed that its external diameter is such that it will fit into the interior of the member $a$ to which it is to be joined by welding.

Its dimension in length is to be sufficient to give accurate alignment and its dimension in thickness, determined by its inside diameter, is to be such that sufficient metal is provided at the bottom of the V joint so that it will act as a chill to the molten metal and also acting as a dam and not burn through when the welding metal is being deposited.

Preferably it is of the shape shown, smoothly arched on its inner surface 4 and tapering to an edge at its outer end, this to provide as little obstruction to the pipe passage as possible, but it is understood that our invention comprehends all other shapes that will accomplish the main purpose of this invention, namely, alignment of parts to be welded and chilling and damming of the welding metal.

The lip 3 fits snugly into the interior of the abutting pipe end; provides an effective sleeve joint at the ends of the pipe; closes the bottom of the V joint and prevents the molten metal from flowing through; places the pipe ends in correct alignment and keeps them there during and after the welding operation.

It is further understood that this joint construction may be applied to all joints regardless of the extent to which the V joint is open from practical closure, so that there may be little opening to as wide a V as the structure will permit.

Figure 3:
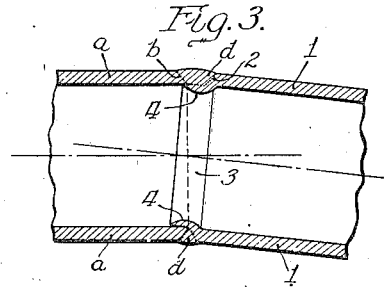
Figure 3 is a sectional lengthwise view of two pipe ends embodying our invention, welded together with one of the pipe ends inclined at an appreciable angle to the other pipe end.

In Figure 3 the member 1, which may be either a pipe end or a fitting, is shown as disposed at an angle to the pipe end a, which is sometimes necessary in practice. Lip 3 spans the relatively wide gap at the top of the joint between the inner edges of the beveled surfaces b and 2 of the members a and 1, respectively, and effectively prevents entry of molten metal into the inside, while also acting as a chill ring, as above described. Slight clearance between lip 3 and the interior of pipe end a, when members 1 and a are disposed in accurate alignment, sufficient to permit of these members being disposed at a slight inclination one to the other as in Figure 3, is not objectionable and will not permit flow of molten metal into the inside, due to the chilling effect of the lip.

A joint thus constructed possesses certain advantages over the loose chill ring used in welding operations, and still further advantages over those joints where no chill ring is used. With the use of this invention the pipe ends can be welded to full thickness or depth of the trough c, without objectionable molten projections within the pipe or inaccurate alignment of the pipe ends.

As pointed out, the lip end is on the fitting, which is machined in a shop, and the plain beveled end is on the pipe to which it is joined and which is cut to length in the field.

What we claim is:—

As an article of manufacture, a pipe fitting comprising a tubular wall presenting an annular end surface adapted to be joined by welding with the end of a conventional pipe of uniform diameter, the end of said fitting being provided with an annular lip offset inwardly relative to said annular wall, said lip being adapted to be inserted in said pipe end to position said fitting relative to said pipe during the welding operation and providing a dam for preventing entrance of welding material into the interior of the joined fitting and pipe.

CHARLES R. BIRDSEY.
EDWARD HALL TAYLOR.